United States Patent
Jung et al.

(10) Patent No.: US 9,013,479 B2
(45) Date of Patent: Apr. 21, 2015

(54) APPARATUS AND METHOD FOR TILE-BASED RENDERING

(75) Inventors: Seok Yoon Jung, Seoul (KR); Kyoung June Min, Yongin-si (KR); Sang Oak Woo, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 758 days.

(21) Appl. No.: 12/907,502

(22) Filed: Oct. 19, 2010

(65) Prior Publication Data

US 2011/0164038 A1 Jul. 7, 2011

(30) Foreign Application Priority Data

Jan. 6, 2010 (KR) .................. 10-2010-0000762

(51) Int. Cl.
*G06T 17/20* (2006.01)
*G06T 15/00* (2011.01)

(52) U.S. Cl.
CPC ........... *G06T 15/005* (2013.01); *G06T 2210/08* (2013.01)

(58) Field of Classification Search
USPC .............. 345/419, 420, 557, 558, 422, 423; 707/799; 711/118
See application file for complete search history.

(56) References Cited

U.S. PATENT DOCUMENTS

| | | | | |
|---|---|---|---|---|
| 5,909,562 A * | 6/1999 | Faget et al. | .................. | 710/310 |
| 6,812,928 B2 * | 11/2004 | Emberling et al. | ........... | 345/531 |
| 6,812,929 B2 * | 11/2004 | Lavelle et al. | ................ | 345/535 |
| 6,819,321 B1 | 11/2004 | Hsieh et al. | | |
| 6,836,272 B2 * | 12/2004 | Leung et al. | ................. | 345/540 |
| 6,885,378 B1 * | 4/2005 | Tsai et al. | ...................... | 345/557 |
| 8,004,521 B2 * | 8/2011 | Falchetto | ....................... | 345/422 |
| 8,059,119 B2 * | 11/2011 | Barone et al. | ................. | 345/419 |
| 8,179,399 B2 * | 5/2012 | Barone | ......................... | 345/581 |
| 2009/0046098 A1 * | 2/2009 | Barone et al. | ................. | 345/420 |

FOREIGN PATENT DOCUMENTS

| | | |
|---|---|---|
| JP | 2006-185460 | 7/2006 |
| KR | 10-0550240 | 2/2006 |
| KR | 10-0840011 | 6/2008 |
| KR | 10-0882842 | 2/2009 |

* cited by examiner

*Primary Examiner* — Kimbinh T Nguyen
(74) *Attorney, Agent, or Firm* — NSIP Law

(57) ABSTRACT

A tile-based rendering apparatus and method is provided. Vertex data sorted based on a tile unit may be stored in a scene buffer and be rendered. Among the stored vertex data, vertex data used several times for rendering may be temporarily stored in a memory or a cache. Vertex data having a probability of being read several times from the scene buffer may be temporarily stored in another memory.

19 Claims, 10 Drawing Sheets

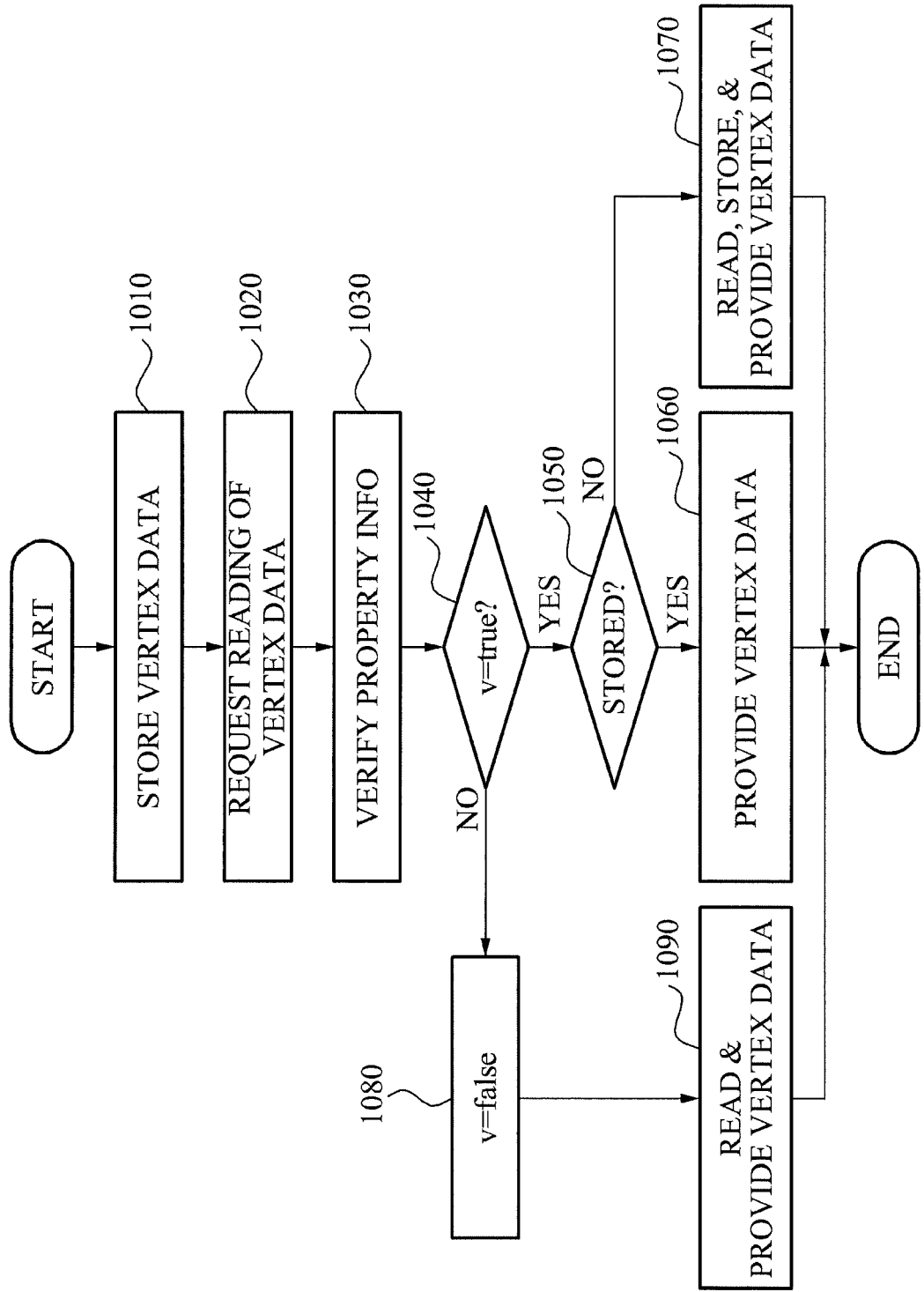

APPARATUS AND METHOD FOR TILE-BASED RENDERING

CROSS-REFERENCE TO RELATED APPLICATIONS

This application claims the priority benefit of Korean Patent Application No. 10-2010-0000762, filed on Jan. 6, 2010, in the Korean Intellectual Property Office, the disclosure of which is incorporated herein by reference.

BACKGROUND

1. Field

One or more embodiments relate to an apparatus and method for tile-based rendering, and more particularly, to an apparatus and method for tile-based rendering that may enhance a rendering performance by decreasing a bandwidth of a memory storing vertex data.

2. Description of the Related Art

A tile-based three-dimensional (3D) graphics rendering apparatus may temporarily store vertex data in a buffer and start a rendering process. When performing the rendering process, the 3D graphics rendering apparatus may repeatedly read vertex data stored in a scene buffer. For example, in the case of a vertex of a triangle located in a tile boundary, the 3D graphics rendering apparatus may read the same vertex at least twice.

When the same data is repeatedly read among vertex data stored in the buffer, a relatively large amount of memory may be used in the buffer. Accordingly, a data processing rate may be enhanced by decreasing a memory bandwidth used to read data from the buffer.

SUMMARY

According to an aspect of one or more embodiments, there may be provided an apparatus for tile-based rendering, including a vertex data storage unit to store vertex data corresponding to a vertex of each of triangles constituting a 3D (dimensional) scene, and a first temporary storage unit to temporarily store vertex data to be rasterized by a rasterizer among the vertex data stored in the vertex data storage unit. When vertex data requested from the rasterizer is stored in the first temporary storage unit, the first temporary storage unit may provide, to the rasterizer, the requested vertex data among the vertex data stored in the first temporary storage unit.

When the requested vertex data is not stored in the first temporary storage unit, the first temporary storage unit may receive the requested vertex data from the vertex data storage unit, temporarily store the received vertex data, and provide the temporarily stored vertex data to the rasterizer.

The first temporary storage unit may store the vertex data provided from the vertex data storage unit according to a first in first out (FIFO) method, and delete the stored vertex data according to the FIFO method. However it is understood that it is not limited to the FIFO method.

The apparatus may further include a first interface unit to provide an interface between the vertex data storage unit and the first temporary storage unit, and to transfer, to the first temporary storage unit, vertex data provided from the vertex data storage unit.

The apparatus may further include a vertex processor to verify the vertex of each of the triangles constituting the 3D scene, and a tile binning unit to divide, based on a tile unit, a display screen area displaying the 3D scene. The vertex data storage unit may store vertex data of the verified vertex based on the tile unit.

The apparatus may further include a second temporary storage unit to receive the requested vertex data from the vertex data storage unit, to temporarily store the received vertex data, and to provide the temporarily stored vertex data to the rasterizer when the requested vertex data is not stored in the first temporary storage unit and the requested vertex data needs to be rasterized at least twice.

The apparatus may further include a second interface unit to determine whether the requested vertex data needs to be rasterized the at least twice based on property information of the requested vertex data. When the second interface unit determines the requested vertex data needs to be rasterized the at least twice, the second temporary storage unit may temporarily store the vertex data provided from the vertex data storage unit.

When the second interface unit determines the requested vertex data needs to be rasterized once, the second interface unit may transfer, to the first temporary storage unit, the vertex data provided from the vertex data storage unit.

When vertex data needing to be rasterized the at least twice is requested again, the second temporary storage unit may provide the temporarily stored vertex data to the rasterizer.

The apparatus may further include a vertex processor to verify the vertex of each of the triangles constituting the 3D scene, and a tile binning unit to divide, based on a tile unit, a display screen area displaying the 3D scene, and to determine a tile including a corresponding triangle. The vertex data storage unit may store vertex data of the verified vertex based on the tile unit.

When a triangle corresponding to the requested vertex data is located in a boundary between at least two tiles, the requested vertex data may be determined to be rasterized the at least twice.

According to another aspect of one or more embodiments, there may be provided an apparatus for tile-based rendering, including a vertex data storage unit to store vertex data corresponding to a vertex of each of triangles constituting a 3D scene, and a temporary storage unit to receive, from the vertex data storage unit, vertex data requested from a rasterizer, to temporarily store the received vertex data, and to provide the temporarily stored vertex data to the rasterizer when the requested vertex data needs to be rasterized at least twice.

According to still another aspect of one or more embodiments, there may be provided an apparatus for tile-based rendering, including a vertex data storage unit to store vertex data corresponding to a vertex of each of triangles constituting a 3D scene, a first temporary storage unit to temporarily store vertex data to be rasterized by a rasterizer among the vertex data stored in the vertex data storage unit, and when vertex data requested from the rasterizer is stored in the first temporary storage unit, to provide the temporarily stored vertex data to the rasterizer, and a second temporary storage unit to receive the requested vertex data from the vertex data storage unit, to temporarily store the received vertex data, and to provide the temporarily stored vertex data to the rasterizer when the requested vertex data is not stored in the first temporary storage unit and the requested vertex data needs to be rasterized at least twice.

According to yet another aspect of one or more embodiments, there may be provided a method for tile-based rendering, including storing, in a vertex data storage unit, vertex data corresponding to a vertex of each of triangles constituting a 3D scene, receiving, from the vertex data storage unit, vertex data requested from a rasterizer to temporarily store the received vertex data, and to provide the temporarily stored vertex data to the rasterizer when the requested vertex data is not temporarily stored in a temporary storage unit, and providing, to the rasterizer, the requested vertex data among the vertex data temporarily stored in the temporary storage unit when the requested vertex data is temporarily stored in the temporary storage unit.

According to a further another aspect of one or more embodiments, there may be provided a method for tile-based rendering, including storing, in a vertex data storage unit, vertex data corresponding to a vertex of each of triangles constituting a 3D scene, receiving, from the vertex data storage unit, vertex data requested from a rasterizer to temporarily store the received vertex data when the requested vertex data needs to be rasterized at least twice, and providing the temporarily stored vertex data to the rasterizer.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 10 illustrates a tile-based rendering method according to another embodiment.

DETAILED DESCRIPTION

Figure 1:
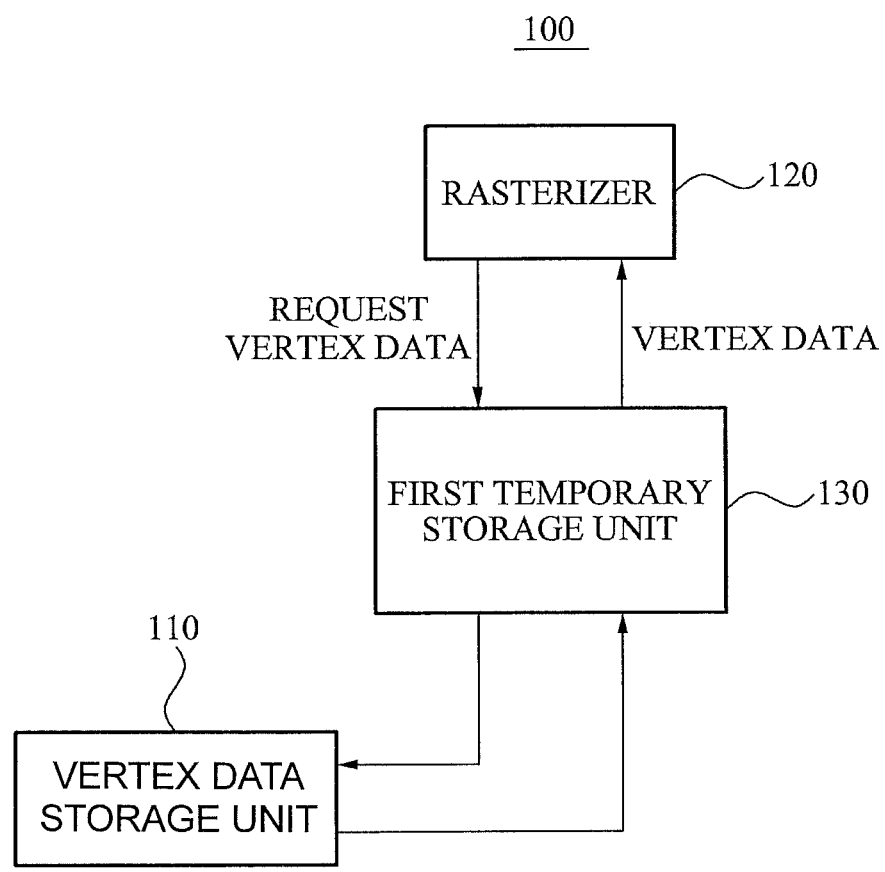
FIG. 1 illustrates a tile-based rendering apparatus according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a tile-based rendering apparatus 100 according to an embodiment.

Referring to FIG. 1, the tile-based rendering apparatus 100 may include a vertex data storage unit 110, a rasterizer 120, and a first temporary storage unit 130.

The vertex data storage unit 110 may store vertex data corresponding to a vertex of each of triangles constituting a 3D scene. The vertex data may include an identifier (ID) of a corresponding vertex, coordinates of the vertex, a color value, a depth value, and the like. The 3D scene may be a three-dimensional (3D) graphics image.

The rasterizer 120 may request the first temporary storage unit 130 for vertex data corresponding to a vertex to be rasterized. The rasterizer 120 may output identification information of vertex data to the first temporary storage unit 130 to request reading of the vertex data. The identification information of the vertex data may be a coordinate value of the vertex.

The rasterizer 120 may rasterize vertex data input from the first temporary storage unit 130 or the vertex data storage unit 110 to generate an image to be displayed on a display unit (not shown).

The first temporary storage unit 130 may temporarily store vertex data to be rasterized by the rasterizer 120 among the vertex data stored in the vertex data storage unit 110. The first temporary storage unit 130 may store the vertex data provided from the vertex data storage unit 110 according to a first in first out (FIFO) method, and may substitute the stored vertex data with new vertex data according to the FIFO method.

The first temporary storage unit 130 may verify whether vertex data requested from the rasterizer 120 is stored in the first temporary storage unit 130. When the requested vertex data is not stored in the first temporary storage unit 130, the first temporary storage unit 130 may receive the requested vertex data from the vertex data storage unit 110, provide the received vertex data to the rasterizer 120, and store the vertex data.

Conversely, when the requested vertex data is stored in the first temporary storage unit 130, the first temporary storage unit 130 may provide the stored vertex data to the rasterizer 120.

In the case of vertex data corresponding to adjacent triangles, the rasterizer 120 may consecutively request the same vertex data and thus previously requested vertex data may be stored in the first temporary storage unit 130. The first temporary storage unit 130 may decrease a memory bandwidth of the vertex data storage unit 110 by providing pre-stored vertex data to the rasterizer 120.

Figure 2:
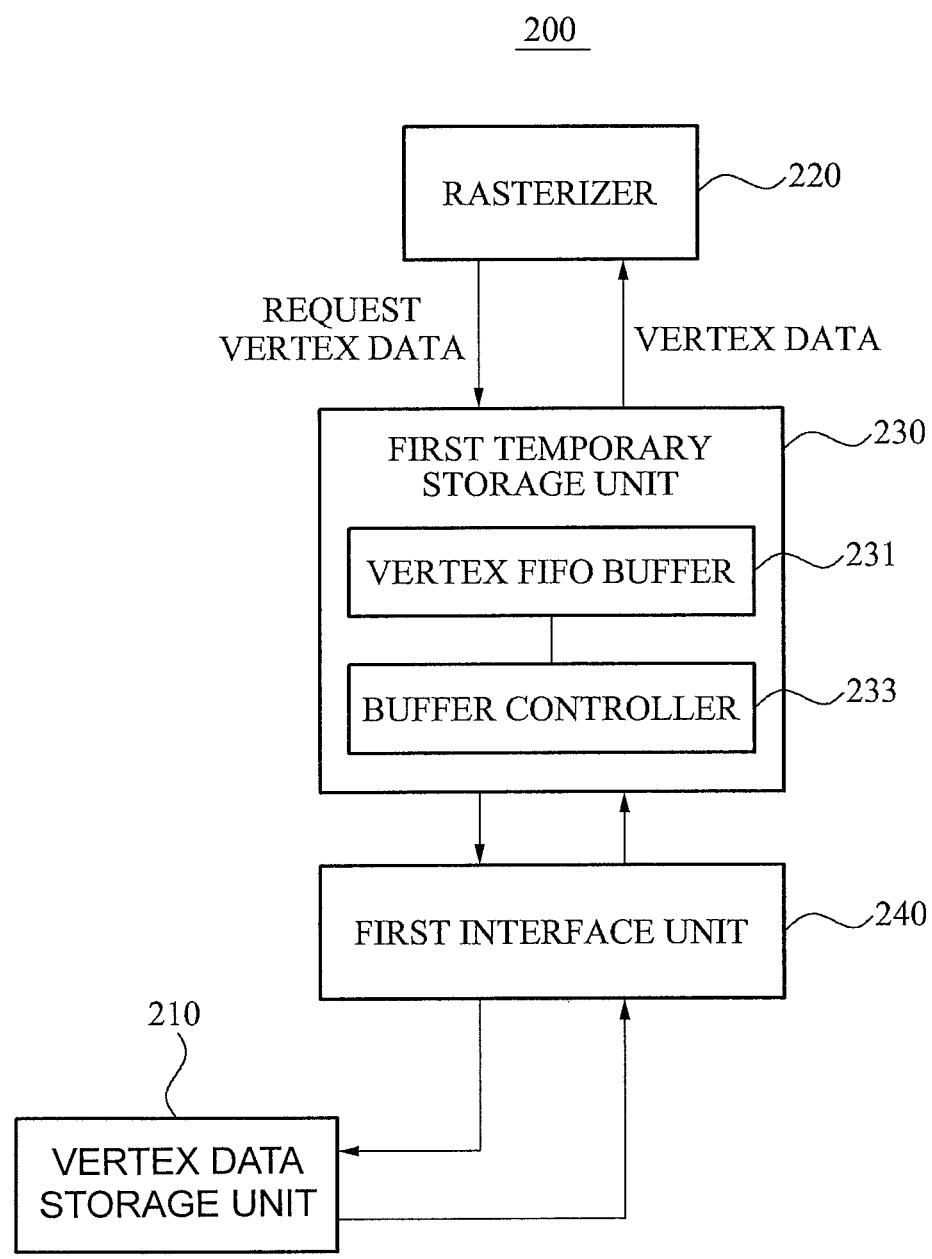
FIG. 2 illustrates a tile-based rendering apparatus according to another embodiment.

FIG. 2 illustrates a tile-based rendering apparatus 200 according to another embodiment.

Referring to FIG. 2, the tile-based rendering apparatus 200 may include a vertex data storage unit 210, a rasterizer 220, a first temporary storage unit 230, and a first interface unit 240. The vertex data storage unit 210, the rasterizer 220, and the first temporary storage unit 230 may be configured to be the same as the vertex data storage unit 110, the rasterizer 120, and the first temporary storage unit 130 of FIG. 1, respectively, and thus further description related thereto will be omitted here.

The first temporary storage unit 230 corresponds to a module configured to store vertex data according to a FIFO method, and may include a vertex FIFO buffer 231 and a buffer controller 233. The vertex FIFO buffer 231 may receive, from the vertex data storage unit 210, vertex data requested by the rasterizer 220, and store the stored vertex data.

When the vertex FIFO buffer 231 is configured to have five stages, five vertex data may be stored in the vertex FIFO buffer 231. When sixth vertex data is input, vertex data initially stored in the vertex FIFO buffer 231 may be substituted with the sixth vertex data.

The buffer controller 233 may verify whether vertex data requested from the rasterizer 220 is stored in the vertex FIFO buffer 231. When the requested vertex data is not stored in the vertex FIFO buffer 231, the buffer controller 233 may request the first interface unit 240 for extraction of the vertex data.

The first interface unit 240 may provide an interface between the vertex data storage unit 210 and the first temporary storage unit 230. In response to a request of the rasterizer 220 or the buffer controller 233, the first interface unit 240 may extract corresponding vertex data from the vertex data storage unit 210 and transfer the extracted vertex data to the first temporary storage unit 230. Accordingly, the first interface unit 240 may be an interface configured to read data of the vertex data storage unit 210.

Figure 3:
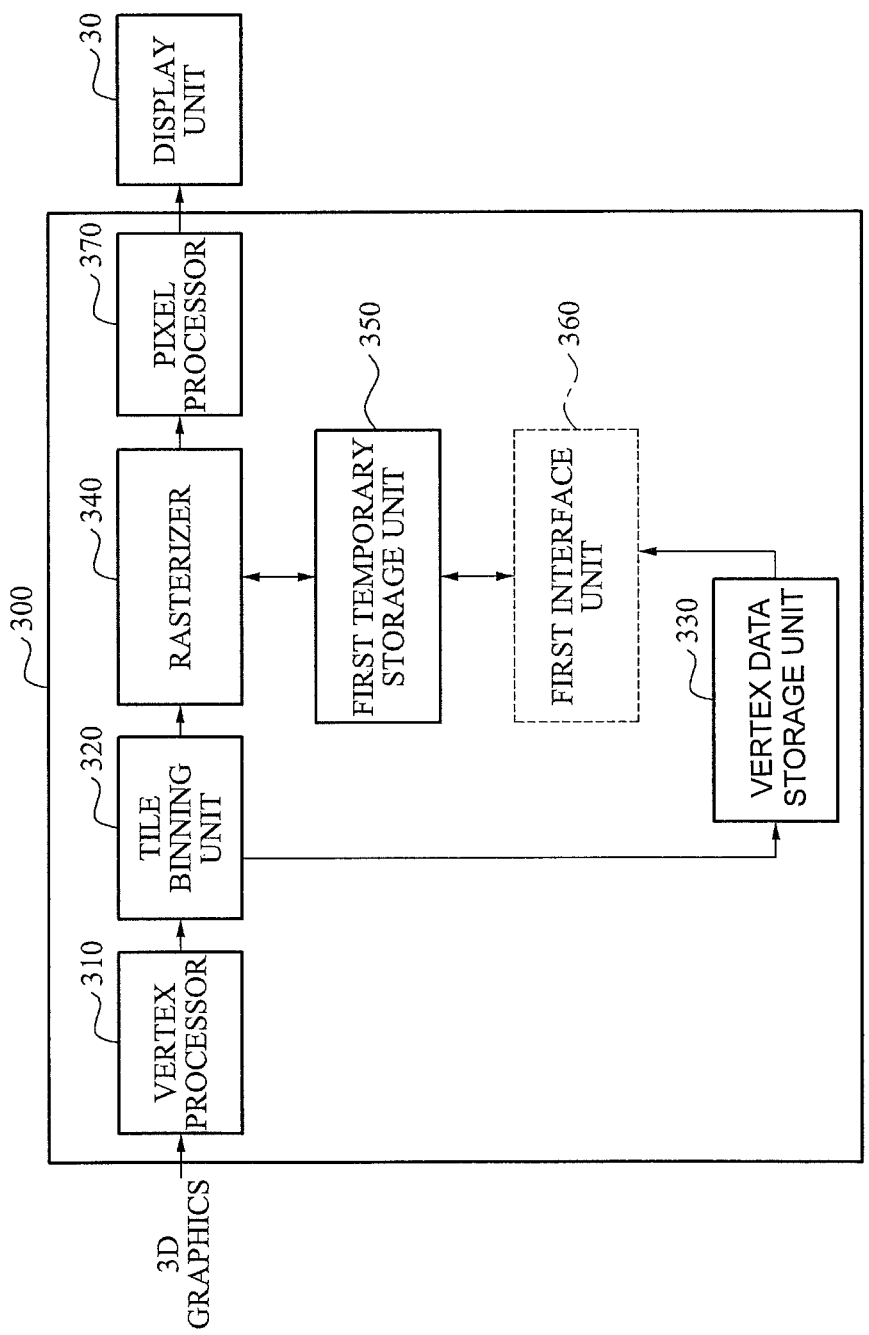
FIG. 3 illustrates a tile-based rendering apparatus according to still another embodiment.

FIG. 3 illustrates a tile-based rendering apparatus 300 according to still another embodiment.

The tile-based rendering apparatus 300 may employ a tile-based rendering method of dividing a screen based on a small unit, for example, a tile unit, and performing rendering, and thereby may process 3D graphics as a two-dimensional (2D) image. In particular, the tile-based rendering apparatus 300 may use multiple memories in order to effectively use a memory space used for rendering.

Referring to FIG. 3, the tile-based rendering apparatus 300 may include a vertex processor 310, a tile binning unit 320, a vertex data storage unit 330, a rasterizer 340, a first temporary storage unit 350, a first interface unit 360, and a pixel processor 370.

The vertex data storage unit 330, the rasterizer 340, and the first temporary storage unit 350 of FIG. 3 may be configured to be the same as the vertex data storage unit 110 or 210, the rasterizer 120 or 220, and the first temporary storage unit 130 or 230 shown in FIG. 1 or FIG. 2, respectively. Accordingly, further description related thereto will be omitted here. The first interface unit 360 may be selectively provided and also be configured to be the same as the first interface unit 240 of FIG. 2. Accordingly, further description related thereto will be omitted here.

The vertex processor 310 may process a 3D scene including a plurality of triangles based on a vertex unit, verify a vertex of each of the triangles, and generate vertex data of each vertex. The vertex data may include coordinates of a corresponding vertex, a color value, a depth value, and the like. The 3D scene may be a 3D graphics image.

Figure 4:
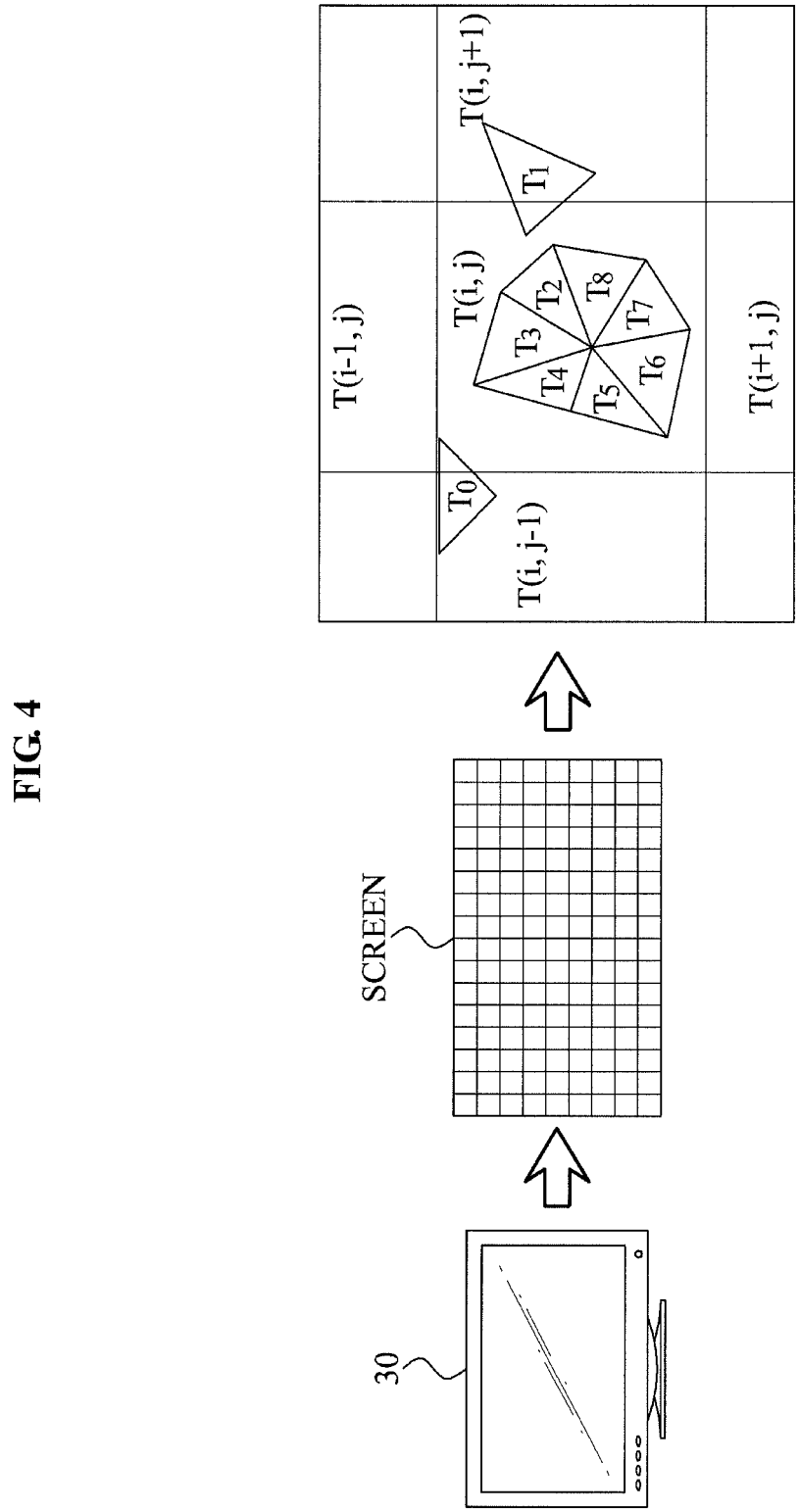
FIG. 4 illustrates relationship among, tiles, triangles, and vertexes in a tile-based rendering apparatus according to an embodiment.

The tile binning unit 320 may divide a display screen area displaying the 3D scene, based on a tile unit. As shown in FIG. 4, a triangle may be positioned in a tile divided by the tile binning unit 320.

FIG. 4 illustrates relationship among, tiles, triangles, and vertexes in a tile-based rendering apparatus according to an embodiment.

Referring to FIG. 4, a display screen area displaying an image to be provided to a user may be divided into a plurality of tiles. A single triangle T1 may be located across two tiles T(i, j) and T(i, j+1). A plurality of triangles $T_2, T_3, T_4, T_5, T_6, T_7$, and $T_8$ may be located in a single tile T(i, j). Here, i and j denote a positive number. The vertex denotes a vertex of a triangle and the plurality of adjacent triangles $T_2, T_3, T_4, T_5, T_6, T_7$, and $T_8$ may share the same vertex.

Referring again to FIG. 3, the tile binning unit 320 may determine a tile including each of triangles to be processed, and may generate a tile list based on a determination result and provide the tile list to the rasterizer 340. The tile list may include identification information of a triangle included in each tile and identification information of each corresponding tile. The tile list may further include coordinate information of each vertex of each triangle or property information of each triangle.

Also, the tile binning unit 320 may determine whether each of triangles belongs to the whole of the corresponding tile or the parts.

The tile binning unit 320 may provide, to the vertex data storage unit 330, vertex data corresponding to each vertex of each triangle, identification information of a corresponding tile or identification information of a corresponding triangle. Identification information of the corresponding tile may be selectively provided.

Identification information of the triangle may be an ID Tn of the triangle. Here, n=0, 1, 2, . . . . Property information of the triangle denotes information indicating whether the triangle is located in a boundary between tiles. Identification information of the tile may be an ID T(i, j) of the tile.

The vertex data storage unit 330 may store, in each corresponding tile, vertex data provided from the tile binning unit 320. For example, the vertex data storage unit 330 may use a scene buffer memory. The stored vertex data may include coordinates of each vertex, an ID of each vertex, a color value, a depth value, and the like.

The rasterizer 340 may verify a triangle to be rasterized based on a tile list, and may request the first temporary storage unit 350 for vertex data corresponding to each vertex of the triangle.

The first temporary storage unit 350 may temporarily store vertex data to be rasterized by the rasterizer 340 among vertex data stored in the vertex data storage unit 330. Specifically, when the first temporary storage unit 350 receives the requested vertex data from the vertex data storage unit 330, the first temporary storage unit 350 may store the vertex data and transfer the vertex data to the rasterizer 340.

Since vertex data requested from the rasterizer 340 may be included in the plurality of triangles $T_2, T_3, T_4, T_5, T_6, T_7$, and $T_8$ and thus may be requested several times, vertex data may be stored in the first temporary storage unit 350. When the requested vertex data is stored in the first temporary storage unit 350, the vertex data stored in the first temporary storage unit 350 may be provided to the rasterizer 340 instead of using the vertex data storage unit 330.

The rasterizer 340 may generate an image to be displayed on a display unit 30 by performing a raster operation with respect to the vertex data input from the vertex data storage unit 330 or the first temporary storage 350.

The pixel processor 370 may generate a pixel from a triangle formed of raster operated vertex data or vertex data. The generated pixel may be displayed as an image on the display unit 30.

Figure 5:
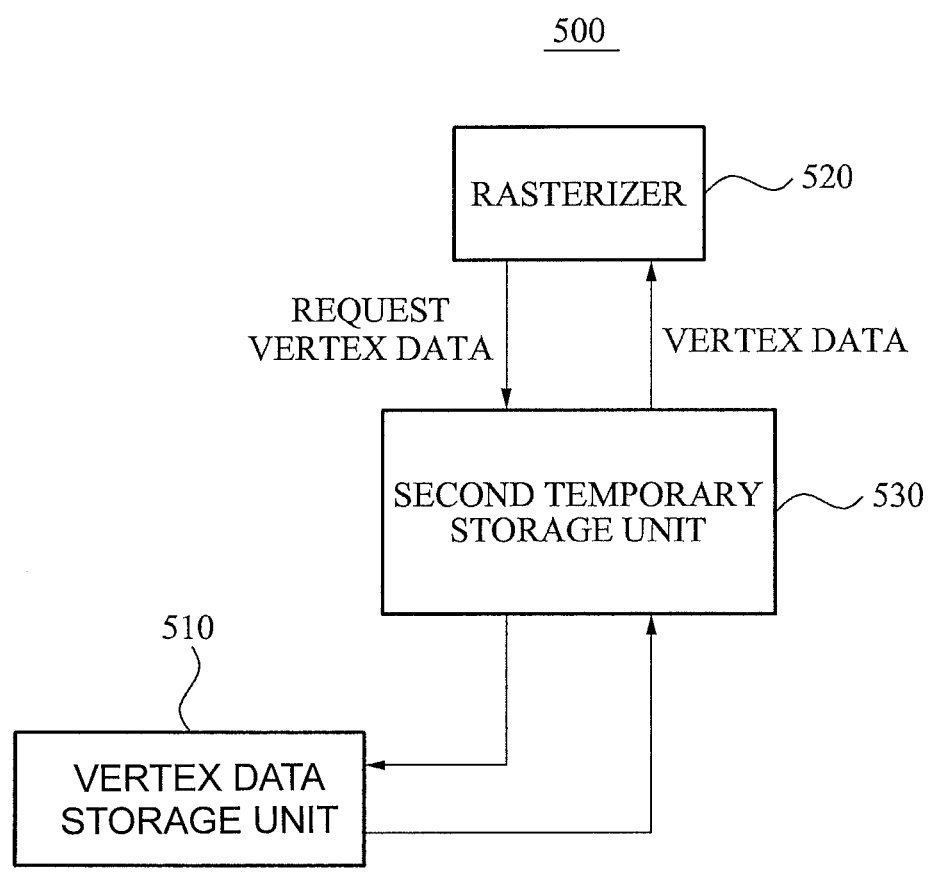
FIG. 5 illustrates a tile-based rendering apparatus according to yet another embodiment.

FIG. 5 illustrates a tile-based rendering apparatus 500 according to yet another embodiment.

The tile-based rendering apparatus 500 may include a vertex data storage unit 510, a rasterizer 520, and a second temporary storage unit 530. The vertex data storage unit 510 and the rasterizer 520 may be configured to be the same as the vertex data storage unit 110 and the rasterizer 120 of FIG. 1 and thus further description related thereto will be omitted here.

The vertex data storage unit 510 may store vertex data corresponding to a vertex of each of triangles constituting a 3D scene.

The rasterizer 520 may request the second temporary storage unit 530 for vertex data corresponding to a vertex to be rasterized. The rasterizer 520 may output identification information and property information of the vertex data to the second temporary storage unit 530 to request reading of the vertex data.

Property information v denotes information indicating whether a corresponding triangle is located in a tile boundary. When v=true, it indicates that the triangle is located in the tile boundary and thus current vertex data may be rasterized at least twice. Conversely, when v=false, it indicates that the triangle is located in a single tile and thus the current vertex data may be rasterized once.

When vertex data requested from the rasterizer 520 needs to be rasterized at least twice, that is, when v=true, the second temporary storage unit 530 may receive the requested vertex data from the vertex data storage unit 510, temporarily store the received vertex data, and provide the temporarily stored vertex data to the rasterizer 520. Accordingly, when vertex data having property information v=true is requested again from the rasterizer 520, the second temporary storage unit 530 may provide the temporarily stored vertex data to the rasterizer 520. For example, referring to FIG. 4, vertex data having property information v=true may be data of vertexes of the triangle T1 located in the tile boundary. The second temporary storage unit 530 may be a cache configured to store vertex data having property information v=true.

When property information of the requested vertex data v=false, the second temporary storage unit 530 may receive the requested vertex data from the vertex data storage unit 510, and provide the vertex data to the rasterizer 520.

In the case of a triangle located in a tile boundary or in a plurality of tiles, it may be highly probable to read again vertex data of the triangle when another tile is rasterized after tile processing of a current tile is completed. Accordingly, the vertex data may be stored in the second temporary storage unit 530. Since the vertex data provided from the second temporary memory 530 is reused, it is possible to decrease a memory bandwidth of the vertex data storage unit 510.

Figure 6:
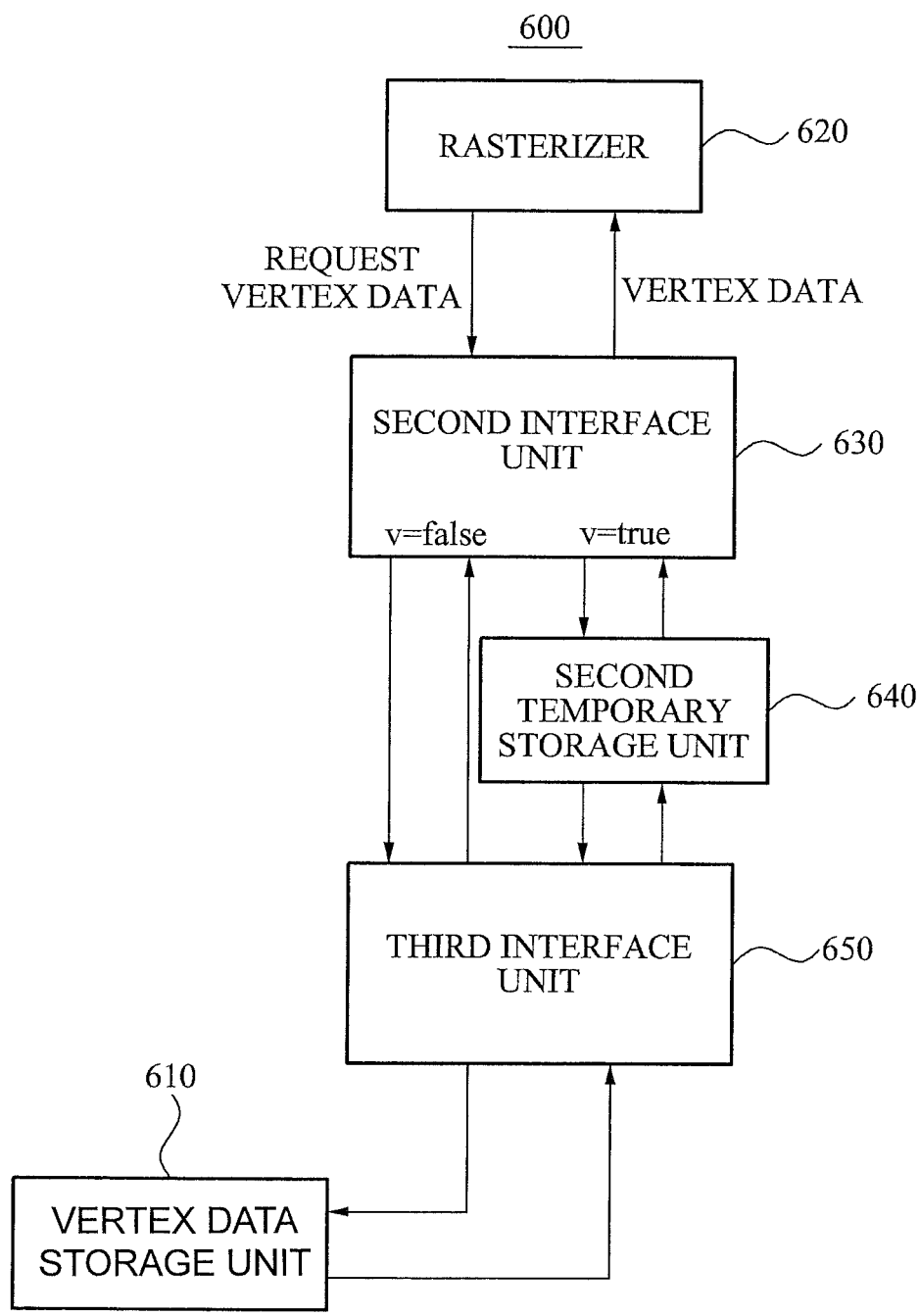
FIG. 6 illustrates a tile-based rendering apparatus according to a further another embodiment.

FIG. 6 illustrates a tile-based rendering apparatus 600 according to a further another embodiment.

Referring to FIG. 6, the tile-based rendering apparatus 600 may include a vertex data storage unit 610, a rasterizer 620, a second interface unit 630, a second temporary storage unit 640, and a third interface unit 650. The vertex data storage unit 610 and the rasterizer 620 may be configured to be the same as the vertex data storage unit 510 and the rasterizer 520 of FIG. 5, respectively, and thus further description related thereto will be omitted here.

The vertex data storage unit 610 may store vertex data corresponding to a vertex of each of triangles constituting a 3D scene.

The rasterizer 620 may request the second interface unit 630 for vertex data to be rasterized. The rasterizer 620 may output property information and identification information of the vertex data to the second interface unit 630 to request reading of the vertex data. Identification information of the vertex data may be a coordinate value of a corresponding vertex or an ID of a corresponding triangle. Property information of the vertex data is described above with reference to FIG. 5 and thus further description related thereto will be omitted here.

The second interface unit 630 may determine whether the requested vertex data needs to be rasterized at least twice based on property information of the requested vertex data. When the requested vertex data needs to be rasterized at least twice, it may indicate that a corresponding triangle is located in a tile boundary or located cross a plurality of tiles.

When the requested vertex data is determined to be rasterized once, that is, when v=false, the second interface unit 630 may output identification information of the requested vertex data to the third interface unit 650.

In response to a request of the second interface unit 630, the third interface unit 650 may read vertex data corresponding to identification information from the vertex data storage unit 610, and may provide the read vertex data to the second interface unit 630. Accordingly, when the requested vertex data is determined to be rasterized once, the second interface unit 630 may directly provide, to the rasterizer 620, the vertex data provided from the vertex data storage unit 610.

When the requested vertex data is determined to be rasterized at least twice, that is, when v=true, the second interface unit 630 may output, to the second temporary storage unit 640, identification information of the requested vertex data.

The second temporary storage unit 640 may determine whether vertex data corresponding to the identification information is stored in the second temporary storage unit 640. When the vertex data is stored, the second temporary storage unit 640 may provide the stored vertex data to the second interface unit 630. When the requested vertex data is stored in the second temporary storage unit 640, it may indicate that the same vertex data has been rasterized and thus is requested again from the rasterizer 620.

When the requested vertex data is not stored in the second temporary storage unit 640, the second temporary storage unit 640 may request the third interface unit 650 for vertex data. In response to the request of the second temporary storage unit 640, the third interface unit 650 may read corresponding vertex data from the vertex data storage unit 610 and provide the read vertex data to the second temporary storage unit 640. The second temporary storage unit 640 may receive the corresponding vertex data from the third interface unit 650, temporarily store the vertex data, and may provide the temporarily stored vertex data to the second interface unit 630. Accordingly, the second interface unit 630 may transfer, to the rasterizer 620, the vertex data provided from the second temporary storage unit 640.

Figure 7:
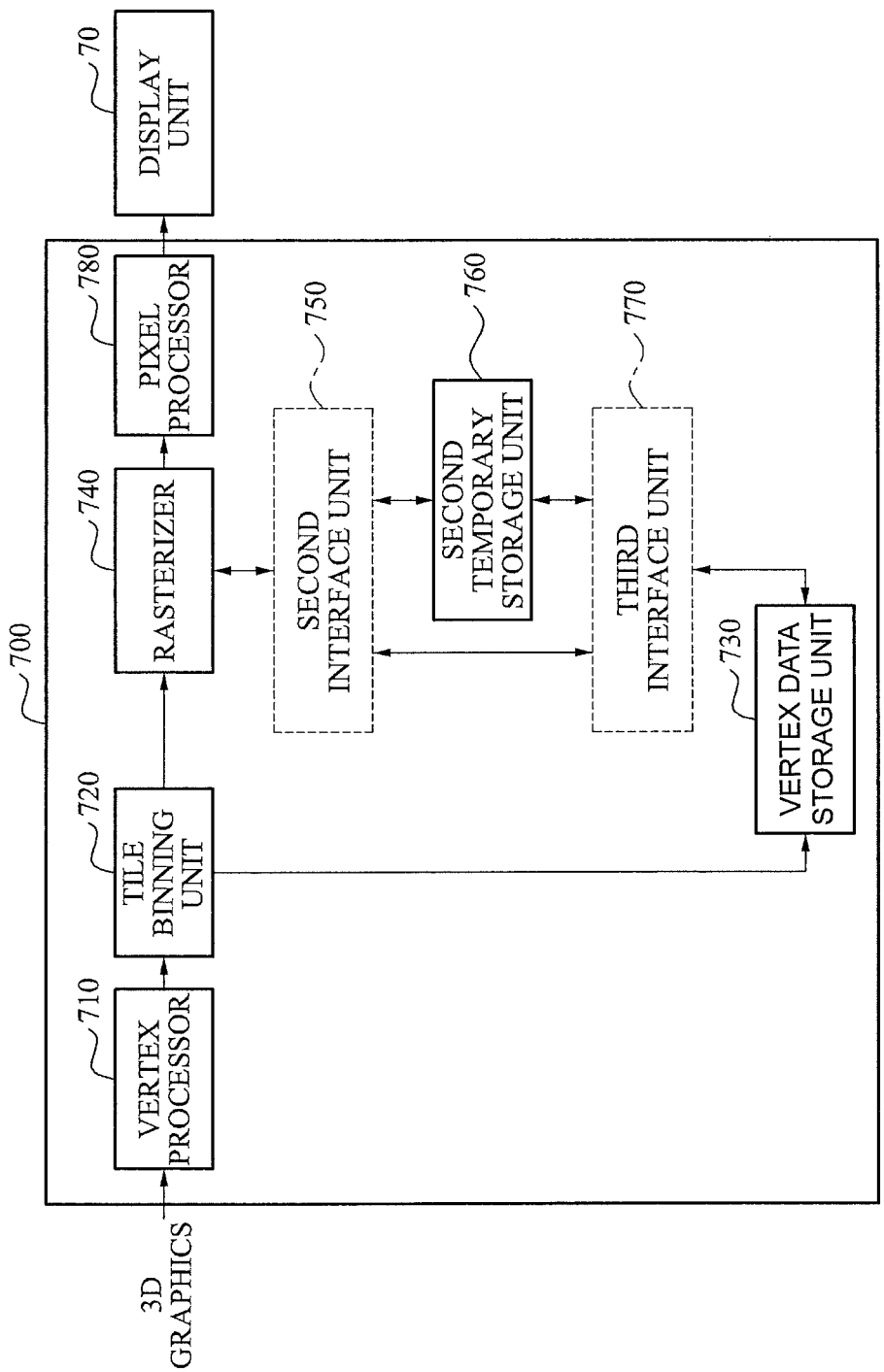
FIG. 7 illustrates a tile-based rendering apparatus according to still another embodiment.

FIG. 7 illustrates a tile-based rendering apparatus 700 according to still another embodiment.

Referring to FIG. 7, the tile-based rendering apparatus 700 may include a vertex processor 710, a tile binning unit 720, a vertex data storage unit 730, a rasterizer 740, a second interface unit 750, a second temporary storage unit 760, a third interface unit 770, and a pixel processor 780.

The vertex data storage unit 730, the rasterizer 740, the second interface unit 750, the second temporary storage unit 760, and the third interface unit 770 may be configured to be the same as the vertex data storage unit 510 or 610, the rasterizer 520 or 620, and the second temporary storage unit 530 or 640 shown in FIG. 5 or FIG. 6, respectively. Accordingly, further description related thereto will be omitted here. The second interface unit 750 and the third interface unit 770 may be selectively provided and may also be configured to be the same as the second interface 630 and the third interface unit 650, respectively. Accordingly, further description related thereto will be omitted here.

The vertex processor 710 may process a 3D scene including a plurality of triangles, based on a vertex unit, verify a vertex of each of the triangles, and generate vertex data of each vertex.

The tile binning unit 720 may divide, based on a tile unit, a display screen area displaying the 2D frame, and may determine a tile including each of triangles to be processed, the 2D frame is generated by projecting the 3D scene on the 2D frame. The tile binning unit 720 may provide, to the rasterizer 740, a tile list including the triangles.

Also, the tile binning unit 720 may determine whether each of triangles belongs to the whole of a corresponding tile or the parts. When the corresponding triangle is located in a tile boundary or is located cross a plurality of tiles, the tile list may include property information v=true, otherwise, the tile list may include property information v=false. The tile binning unit 720 may provide, to the vertex data storage unit 730, vertex data corresponding to each vertex of a corresponding triangle and identification information of a corresponding tile.

The vertex data storage unit 730 may store, for each corresponding tile, vertex data provided from the tile binning unit 720.

The rasterizer 740 may verify, from the provided tile list, a triangle to be raster operated, and may request the second interface unit 750 for vertex data corresponding to each vertex constituting the triangle.

As described above with reference to FIG. 7, the second interface unit 750 may receive the vertex data from the second temporary storage unit 760 or the third interface unit 770 depending on property information of the vertex data, and may provide the received vertex data to the rasterizer 740. When the second interface unit 750 and the third interface unit 770 are not provided, the second temporary storage unit 760 may provide, to the rasterizer 740, vertex data extracted from the vertex data storage unit 730, and may selectively temporarily store the vertex data.

The rasterizer 740 may rasterize the vertex data provided from the second interface unit 750 and the second temporary storage unit 760.

The pixel processor 780 may generate a pixel based on a triangle including the rasterized vertex data or vertex data. The generated pixel may be displayed as an image on a display unit 70.

Figure 8:
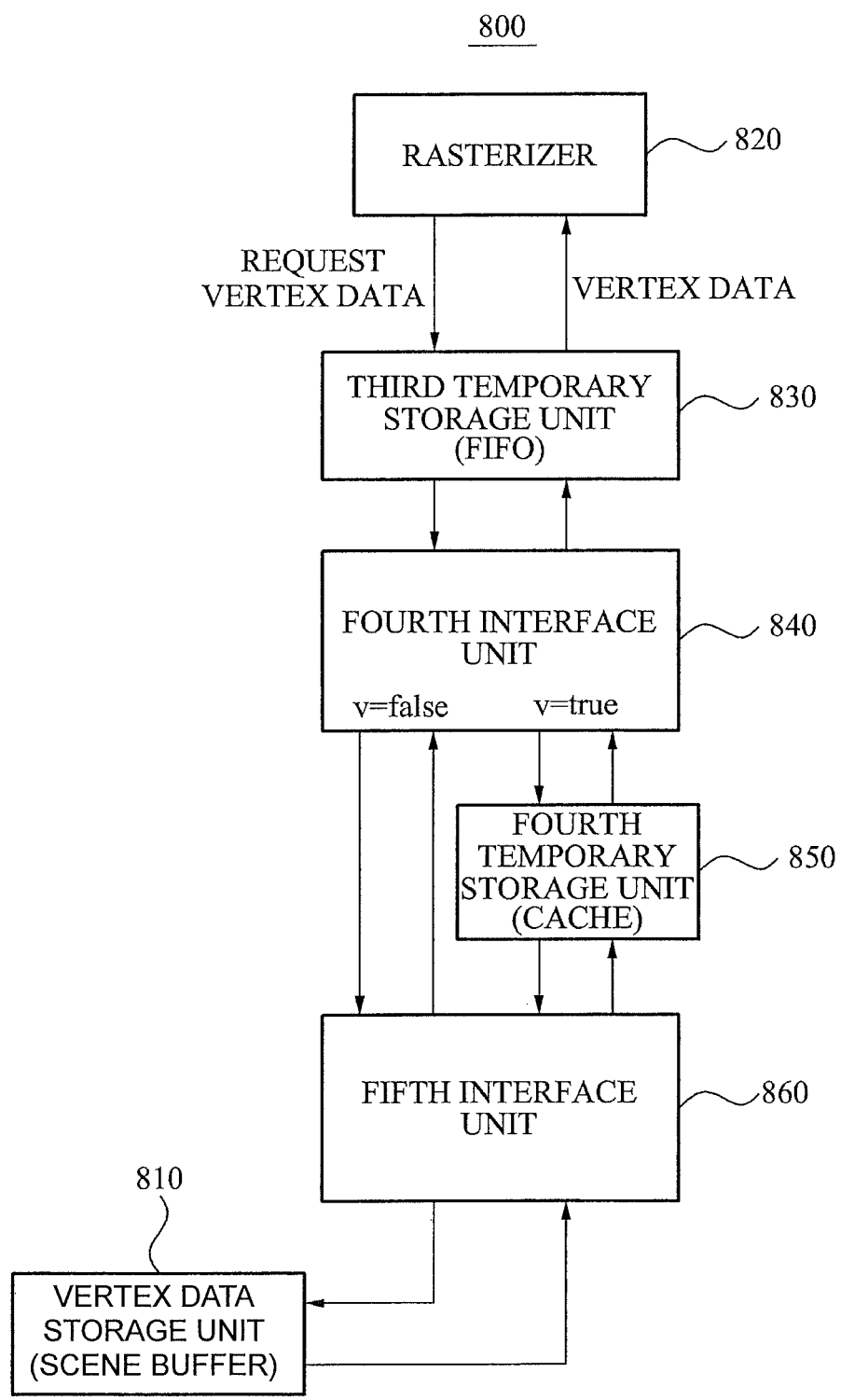
FIG. 8 illustrates a tile-based rendering apparatus according to still another embodiment.

FIG. 8 illustrates a tile-based rendering apparatus 800 according to still another embodiment.

Referring to FIG. 8, the tile-based rendering apparatus 800 may include a vertex data storage unit 810, a rasterizer 820, a third temporary storage unit 830, a fourth interface unit 840, a fourth temporary storage unit 850, and a fifth interface unit 860.

The third temporary storage unit 830 may be configured to be the same as the first temporary storage unit 130 of FIG. 1 or the first temporary storage unit 230 of FIG. 2, and the fourth temporary storage unit 850 may be configured to be the same as the second temporary storage unit 530 of FIG. 5 or the second temporary storage unit 640 of FIG. 6. The tile-based rendering apparatus 800 may further include the vertex processor 310 or 710, the tile binning unit 320 or 720, and the pixel processor 370 or 780 shown in FIG. 3 or FIG. 7, respectively. Thus, further description related thereto will be omitted for ease of description.

The vertex data storage unit 810 may store vertex data corresponding to a vertex of each of triangles constituting a 3D scene. Here, the vertex data storage unit 810 may be a scene buffer.

The rasterizer 820 may output property information and identification information of vertex data to the third temporary storage unit 830 to request reading of the vertex data. Identification information of vertex data may be, for example, a coordinate value of a corresponding vertex. Property information of vertex data is described above with reference to FIG. 5 and thus further description will be omitted here.

The third temporary storage unit 830 may be a memory module configured to store vertex data according to a FIFO method. When requested vertex data is not stored in the third temporary storage unit 830, the third temporary storage unit 830 may output identification information and property information of the vertex data to the fourth interface unit 840.

The fourth interface unit 840 may verify property information of the requested vertex data. When v=true, the fourth interface unit 840 may provide identification information of the vertex data to the fourth temporary storage unit 850 to request reading of the vertex data. Conversely, when v=false, the fourth interface unit 840 may provide identification information of the vertex data to the fifth interface unit 860 to request reading of the vertex data.

The fifth interface unit 860 may read, from the vertex data storage unit 810, vertex data corresponding to identification information received from the fourth interface unit 840, and may provide the read vertex data to the fourth interface unit 840.

The fourth temporary storage unit 850 may determine whether vertex data corresponding to identification information is stored in the fourth temporary storage unit 850. When the vertex data is stored, the fourth temporary storage unit 850 may provide the stored vertex data to the fourth interface unit 840. Conversely, when the requested vertex data is not stored, the fourth temporary storage unit 850 may provide identification information of the vertex data to the fifth interface unit 860.

The fifth interface unit 860 may read vertex data corresponding to the identification information provided from the fourth temporary storage unit 850, and may provide the read vertex data to the fourth temporary storage unit 850. The fourth temporary storage unit 850 may temporarily store vertex data provided from the fifth interface unit 860 and then provide the temporarily stored vertex data to the fourth interface unit 840.

The fourth interface unit 840 may transfer, to the third temporary storage unit 830, vertex data provided from the fourth temporary storage unit 850 or the fifth interface unit 860.

The third temporary storage unit 830 may store the vertex data directly transferred from the fifth interface unit 860 to the fourth interface unit 840, and then may provide the stored vertex data to the rasterizer 820. The third temporary storage unit 830 may provide, to the rasterizer 820, the vertex data transferred from the fourth temporary storage unit 850 to the fourth interface unit 840, instead of storing the transferred vertex data. This is because the vertex data transferred from the fourth temporary storage unit 850 is stored in the fourth temporary storage unit 850.

Hereinafter, a tile-based rendering method according to an embodiment will be described.

Figure 9:
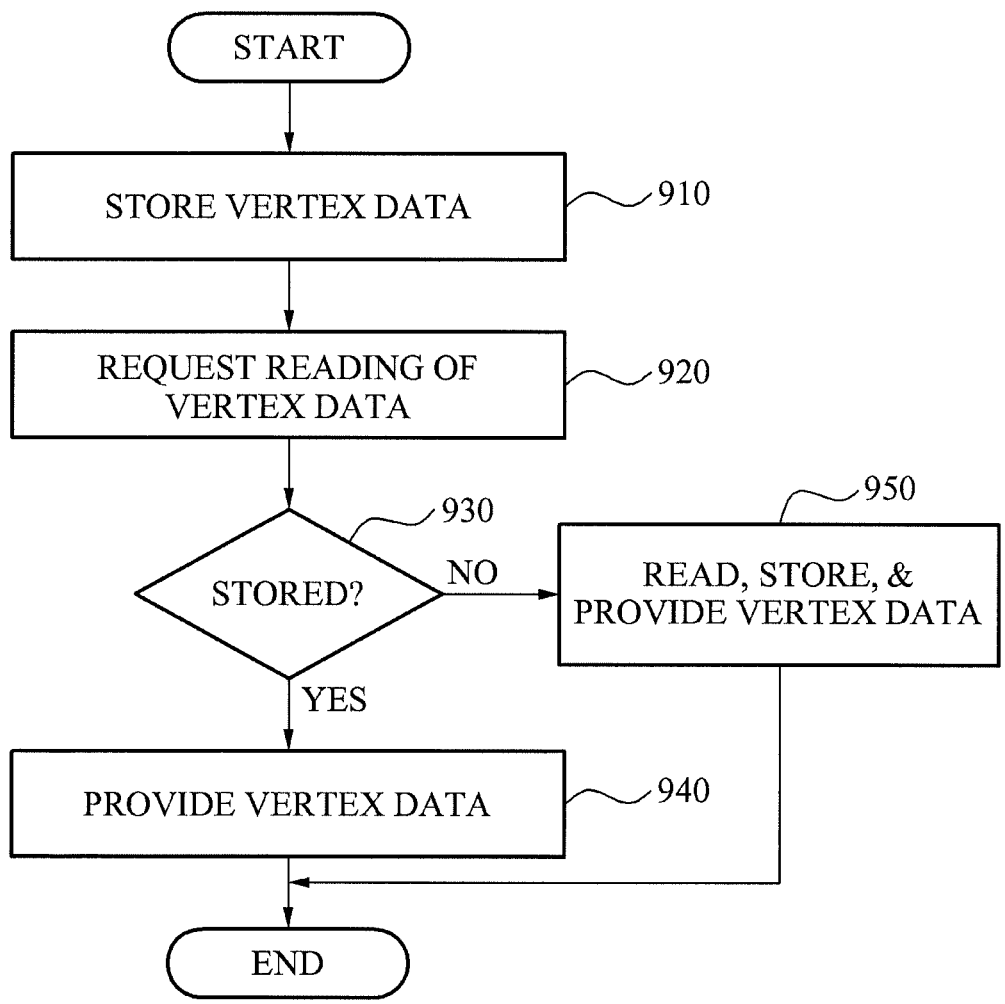
FIG. 9 illustrates a tile-based rendering method according to an embodiment.

FIG. 9 illustrates a tile-based rendering method according to an embodiment.

Referring to FIGS. 1 and 9, in operation 910, vertex data corresponding to a vertex of each of triangles constituting a 3D scene may be stored in the vertex data storage unit 110.

When reading of vertex data is requested from the rasterizer 120 in operation 920, the first temporary storage unit 130 may determine whether the requested vertex data is stored in the temporary storage unit 130 in operation 930.

When the requested vertex data is stored in operation 930, the first temporary storage unit 130 may provide the stored vertex data to the rasterizer 120 in operation 940.

Conversely, when the requested vertex data is not stored in the temporary storage unit 130 in operation 930, the first temporary storage unit 130 may read corresponding vertex data from the vertex data storage unit 110, temporarily store the read vertex data, and provide the temporarily stored vertex data to the rasterizer 120 in operation 950. The first temporary storage unit 130 may be a module configured to store vertex data according to a FIFO method. Accordingly, when a storage area of the first temporary storage unit 130 is fully filled, initially stored vertex data may be substituted with vertex data to be newly stored.

FIG. 10 illustrates a tile-based rendering method according to another embodiment.

Referring to FIGS. 5 and 10, in operation 1010, vertex data corresponding to a vertex of each of triangles constituting a 3D scene may be stored in the vertex data storage unit 510.

When reading of vertex data is requested from the rasterizer 520 in operation 1020, the second temporary storage unit 530 may verify property information of the requested vertex data in operation 1030.

When property information v=true in operation 1040, the second temporary storage unit 530 may verify whether the vertex data is stored in the second temporary storage unit 530 in operation 1050.

When the vertex data is stored in operation 1050, the second temporary storage unit 530 may provide the stored vertex data to the rasterizer 520 in operation 1060.

When the vertex data is not stored in operation 1050, the second temporary storage unit 530 may read corresponding vertex data from the vertex data storage unit 510, temporarily store the read vertex data, and provide the temporarily stored vertex data to the rasterizer 520 in operation 1070.

In operation 1080, the property information may be verified as v=false. In operation 1090, the second temporary storage unit 530 may read corresponding vertex data from the vertex data storage unit 510 and provide the read vertex data to the rasterizer 520.

According to an embodiment, vertex data sorted based on a tile unit may be stored in a scene buffer and be rendered. Among the stored vertex data, vertex data used several times for rendering may be temporarily stored in a cache or a memory according to a FIFO method. Specifically, vertex data read several times from the scene buffer may be temporarily stored in another memory.

Accordingly, the same vertex data may not be repeatedly read from the scene buffer. It is possible to decrease a large amount of memory bandwidth occurring in a scene memory by reading the same vertex data from an additional memory or buffer. Also, since a relatively small capacity of a FIFO memory and a cache memory may be used, it is possible to save costs used for decreasing the memory bandwidth of the scene buffer.

The tile-based rendering method according to the above-described embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for tile-based rendering, comprising:
a vertex data storage unit configured to store vertex data corresponding to vertexes of a plurality of triangles constituting a 3D scene, at least one of the vertexes being a vertex shared by adjacent triangles among the plurality of triangles; and
a first temporary storage unit configured to temporarily store vertex data, among the vertex data stored in the vertex data storage unit, requested by a rasterizer to be rasterized by the rasterizer, and to provide the temporarily stored vertex data to the rasterizer,
wherein when select vertex data, which is again requested from the rasterizer, is stored in the first temporary storage unit after having been provided to the rasterizer, the first temporary storage unit again provides, to the rasterizer, the again requested select vertex data to the rasterizer.

2. The apparatus of claim 1, wherein the first temporary storage unit stores the vertex data provided from the vertex data storage unit according to a first in first out (FIFO) method, and deletes the stored vertex data according to the FIFO method.

3. The apparatus of claim 1, further comprising:
a first interface unit to provide an interface between the vertex data storage unit and the first temporary storage unit, and to transfer, to the first temporary storage unit, vertex data provided from the vertex data storage unit.

4. The apparatus of claim 1, further comprising:
a vertex processor to verify the vertex of each of the triangles constituting the 3D scene; and
a tile binning unit to divide, based on a tile unit, a display screen area displaying a 2D frame and to determine a tile including each of triangles to be processed, the 2D frame is generated by projecting the 3D scene on the 2D frame,
wherein the vertex data storage unit stores vertex data of the verified vertex based on the tile unit.

5. The apparatus of claim 1, further comprising:
a second temporary storage unit to receive requested vertex data from the vertex data storage unit, to temporarily store the received vertex data, and to again provide, the temporarily stored requested vertex data to the rasterizer when the requested vertex data is not stored in the first temporary storage unit and the requested vertex data needs to be rasterized in at least two tiles.

6. The apparatus of claim 5, further comprising:
a second interface unit to determine whether the requested vertex data needs to be rasterized in the at least two tiles based on property information of the requested vertex data,
wherein when the second interface unit determines the requested vertex data needs to be rasterized in the at least two tiles, the second temporary storage unit temporarily stores the requested vertex data.

7. The apparatus of claim 6, wherein when the second interface unit determines the requested vertex data needs to be rasterized in only one of the at least two tiles, the second interface unit transfers, to the first temporary storage unit, the requested vertex data provided from the vertex data storage unit without storing the requested vertex data in the second temporary storage unit.

8. The apparatus of claim 5, further comprising:
a vertex processor to verify the vertex of each of the triangles constituting the 3D scene; and
a tile binning unit to divide, based on a tile unit, a display screen area displaying a 2D frame and to determine a tile including each of triangles to be processed, the 2D frame is generated by projecting the 3D scene on the 2D frame,
wherein the vertex data storage unit stores vertex data of the verified vertex based on the tile unit.

9. The apparatus of claim 8, wherein when a triangle corresponding to the requested vertex data is located in a boundary between the at least two tiles, the requested vertex data is stored in the second storage unit.

10. An apparatus for tile-based rendering, comprising:
a vertex data storage unit configured to store vertex data corresponding to vertexes of a plurality of triangles constituting a 3D scene, at least one of the vertexes being a vertex shared by adjacent triangles among the plurality of triangles; and
a temporary storage unit configured to receive, from the vertex data storage unit, vertex data upon the vertex data being requested from a rasterizer, to temporarily store the received vertex data, to provide the temporarily stored vertex data to the rasterizer, to continue to temporarily store select vertex data of the temporarily stored vertex data having been provided to the rasterizer, and to again provide the stored select vertex data to the rasterizer when the rasterizer requests the select vertex data again.

11. The apparatus of claim 10, further comprising:
an interface unit to determine whether the requested vertex data needs to be rasterized the at least twice based on property information of the requested vertex data,
wherein when the interface unit determines the requested vertex data needs to be rasterized the at least twice, the temporary storage unit temporarily stores the requested vertex data provided from the vertex data storage unit as the stored select vertex data.

12. The apparatus of claim 10, wherein when the interface unit determines the requested vertex data needs to be rasterized only once for a current tile, the interface unit provides, to the rasterizer, the requested vertex data provided from the vertex data storage unit only once for a current tile.

13. The apparatus of claim 10, further comprising:
a vertex processor to verify the vertex of each of the triangles constituting the 3D scene; and
a tile binning unit to divide, based on a tile unit, a display screen area displaying a 20 frame and to determine a tile including each of triangles to be processed, the 20 frame is generated by projecting the 3D scene on the 20 frame,
wherein the vertex data storage unit stores vertex data of the verified vertex based on the tile unit.

14. The apparatus of claim 13, wherein when a triangle corresponding to the requested vertex data by the rasterizer is located in a boundary between at least two tiles, the requested vertex data is determined to be rasterized at least twice and the requested vertex data is set to be continued to be temporarily stored after at least one of the at least two tiles has been rasterized.

15. An apparatus for tile-based rendering, comprising:
a vertex data storage unit configured to store vertex data corresponding to vertexes of a plurality of triangles constituting a 3D scene, at least one of the vertexes being a vertex shared by adjacent triangles among the plurality of triangles;
a first temporary storage unit configured to temporarily store vertex data to be rasterized by a rasterizer among the vertex data stored in the vertex data storage unit, to provide the temporarily stored vertex data to the rasterizer, and when select vertex data, of the temporarily stored vertex data having been provided to the rasterizer, is requested again from the rasterizer the first temporary storage unit provides the temporarily stored select vertex data to the rasterizer again; and
a second temporary storage unit configured to receive requested vertex data from the vertex data storage unit, to temporarily store the received vertex data after the requested vertex data is provided to the rasterizer from the first temporary storage unit, and to again provide the temporarily stored received vertex data to the rasterizer when the requested vertex data is not stored in the first temporary storage unit and the requested vertex data needs to be rasterized again.

16. A method for tile-based rendering, comprising:
storing, in a vertex data storage unit, vertex data corresponding to vertexes of a plurality of triangles constituting a 3D scene, at least one of the vertexes being a vertex shared by adjacent triangles among the plurality of triangles;
receiving in a temporary storage unit, from the vertex data storage unit, vertex data requested from a rasterizer;
temporarily storing the received vertex data in the temporary storage unit;
providing the temporarily stored vertex data to the rasterizer; and
providing select vertex data, of the received vertex data, to the rasterizer again when same vertex data is again requested by the rasterizer for a current tile.

17. A method for tile-based rendering, comprising:
storing, in a vertex data storage unit, vertex data corresponding to vertexes of a plurality of triangles constituting a 3D scene, at least one of the vertexes being a vertex shared by adjacent triangles among the plurality of triangles;
receiving, from the vertex data storage unit, vertex data upon the vertex data being requested from a rasterizer;
providing the received vertex data to the rasterizer;
temporarily storing select vertex data, of the received vertex data, when the requested select vertex data will be requested again by the rasterizer; and
providing the temporarily stored select vertex data again to the rasterizer upon the select vertex data being again requested by the rasterizer.

18. A non-transitory computer-readable recording medium storing a program to implement the method of claim 16.

19. An apparatus for tile-based rendering, comprising:
a vertex data storage unit configured to store vertex data corresponding to vertexes of a plurality of triangles constituting a 3D scene, at least one of the vertexes being a vertex shared by adjacent triangles among the plurality of triangles; and
a first temporary storage configured to temporarily store vertex data to be rasterized by a rasterizer among the vertex data stored in the vertex data storage unit,
wherein, when vertex data requested by the rasterizer is not stored in the first temporary storage unit, the first temporary storage unit receives the requested vertex data from the vertex data storage unit, temporarily stores the received vertex data, provides the temporarily stored vertex data to the rasterizer, and maintains temporary storage of select vertex data of the vertex data provided to the rasterizer for a next rasterizer request, and
wherein, when same vertex data is again requested by the rasterizer, the first temporary storage unit provides, to the rasterizer, the same vertex data from among the temporarily stored select vertex data in the first temporary storage unit.

* * * * *